United States Patent
Kobayashi (10) Patent No.: US 7,021,169 B2
(45) Date of Patent: *Apr. 4, 2006

(54) AUTOMATIC TRANSMISSION

(75) Inventor: Toshio Kobayashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/414,021

(22) Filed: Apr. 16, 2003

(65) Prior Publication Data

US 2003/0196503 A1    Oct. 23, 2003

(30) Foreign Application Priority Data

Apr. 19, 2002  (JP) .............................. 2002-117071

(51) Int. Cl.
 *F16H 3/08* (2006.01)
(52) U.S. Cl. .......................................... 74/333; 74/330
(58) Field of Classification Search .......... 74/325–335; 192/87.11, 87.15
See application file for complete search history.

(56) References Cited

U.S. PATENT DOCUMENTS

| | | | | |
|---|---|---|---|---|
| 2,970,497 A | * | 2/1961 | Foerster | ....................... 475/54 |
| 4,576,063 A | * | 3/1986 | Akashi et al. | ................. 74/745 |
| 4,784,019 A | * | 11/1988 | Morscheck | ................... 74/720 |
| 6,826,974 B1 | * | 12/2004 | Kobayashi | ..................... 74/339 |
| 2002/0148310 A1 | * | 10/2002 | Uchino | |

FOREIGN PATENT DOCUMENTS

| | | | |
|---|---|---|---|
| JP | 4-262166 | | 9/1992 |
| JP | 2000055184 A | * | 2/2000 |
| JP | 2000-65199 | | 3/2000 |

* cited by examiner

*Primary Examiner*—Tisha D. Lewis
(74) *Attorney, Agent, or Firm*—Smith Gambrell & Russell LLP (57) ABSTRACT

An automatic transmission with input shaft having drive gears and an output shaft with driven gears engaging with the drive gears are provided. A transmission gear for transmitting a power is selectively switched from transmission gear trains of the drive gears and driven gears, by a switching mechanism. An input clutch for switching engine power transmission and input shaft disconnect states is arranged between an engine crankshaft and the input shaft. Bypass clutches capable of transmitting the power to the respective transmission gear trains are provided at an end portion of the input shaft, and the engine power is transmitted to the output shaft via at least any one of the bypass clutches at a time of shifting gears. The input clutch and the plurality of bypass clutches are concentrically arranged in series between the engine and the input shaft providing size reduction.

13 Claims, 6 Drawing Sheets

FIG. 5(A)
PRESENT INVENTION

AUTOMATIC TRANSMISSION

TECHNICAL FIELD OF THE INVENTION

The present invention relates to an automatic transmission mounted on a vehicle, and more particularly to an automatic transmission having a plurality of transmission gear trains, which are easily selective as required for any driving conditions thereof.

BACKGROUND OF THE INVENTION

A manual transmission (MT) carrying out a gear shift operation manually has an input shaft to which a plurality of drive gears are provided, and an output shaft to which a plurality of driven gears forming transmission gear trains together with the drive gears are provided. An engine power is input to the input shaft via an input clutch, and the output shaft is connected to a drive wheel. In this MT, a gear shift operation, that is, a shift change is carried out by disconnecting the input clutch for changing gears, thereafter switching by an engagement clutch such as a synchro-mesh mechanism or the like into one of the gear trains to carry out the power transmission by selecting a gear train from a plurality of transmission gear trains, and connecting the input clutch thereto.

In the case where the shift change and the clutch operation are driven by a hydraulic actuator and where the hydraulic actuator is electronically controlled, an automatic transmission having a structure on the basis of the manual transmission system can be obtained. This type of automated manual transmission (hereinafter, refer briefly to as an AMT) having a plurality of the transmission gear trains has advantages that a weight saving can be easily attained by reducing a number of parts in comparison with an ordinary torque converter type automatic transmission (AT) having planetary gears in an automatic transmission mechanism, and that a power transmitting efficiency becomes high.

In this AMT, when carrying out the gear shift by an electronic control, the gear shift operation is carried out by disconnecting the input clutch provided between a crankshaft of the engine and the input shaft of the transmission so as to temporarily disconnect the power, in accordance with an automatic gear shift schedule (or pattern) which is previously determined on the basis of a vehicle speed, a throttle opening degree of the engine and the like, so that no torque transmitting condition is instantly generated when shifting the gear. Accordingly, for example, in the case where the transmission of the engine power to the transmission system is disconnected for a moment when shifting up to a second speed from a first speed in which there is a large difference in a gear ratio, the drive force change is large even if structured for the drive force to be smoothly changed between before and after the gear shifts. Thus, the driver feels the driving speed reduced as well as torque loss during the gear shift, so that the driver may feel uncomfortable.

For the purpose of avoiding such torque disconnection while the gear shift operation, the automatic transmission provided with a hydraulic multiple disc type bypass clutch is disclosed in, for example, Japanese Patent Application Laid-Open No. 2000-65199.

This publication discloses an automatic transmission in which first to fifth speed gear trains are provided in input and output shafts; switching between the first and second speed gear trains and switching between the third and fourth speed gear trains are respectively carried out by using the same synchronizer mechanism as that of the conventional manual transmission; and transmitting the power and disconnecting the torque transmission on the basis of the fifth speed gear train are carried out by a bypass clutch. In this automatic transmission, a torque reduction from the input shaft to the output shaft is prevented by transmitting the power from the fifth speed gear train by connecting the bypass clutch at a time of the gear shift. However, since the bypass clutch is provided in the fifth speed gear train, a torque transmitting capacity to the output shaft from the input shaft via the bypass clutch corresponds to a gear ratio of the fifth speed.

Accordingly, at a time of shifting gears from the first speed to the second speed, the torque capacity which can be transmitted to the output shaft from the input shaft via the bypass clutch for the purpose of preventing the torque disconnection becomes a drive force applied by the gear shift ratio of the fifth speed. And the gear ratio difference is large between this speed and the second speed even by adding the torque increase generated by an inertia moment in the input side of the bypass clutch, so that it is impossible to sufficiently compensate the difference in the driving force change between the both. If the difference is large, not only the gear shift shock is generated so as to cause a reduction in a gear shift quality of the automatic transmission, but also the torque is reduced during the gear shift even when an acceleration is required, so that the driver feels uncomfortable. In the same manner, when shifting the gears from the second speed to the third speed, it is also impossible to sufficiently compensate the difference between the transmission torque transmitted via the bypass clutch and the drive force change caused by the gear shift ratio difference from the second speed to the third speed, even by adding the torque increase generated by the inertia moment mentioned above, so that a gear shift shock is generated and a gear shift quality reduction is caused.

In order to improve a fuel consumption and a quietness during a high speed cruising and applying a large start drive force and a large traction force to a four-wheel drive vehicle, there is a case of mounting on a vehicle an automatic transmission provided with a gear ratio in which a number of shift ranges is set equal to or more than five ranges, for example, six ranges, or further one range of extra low range gear ratio is added to the transmission gear ranges, thereby improving a quality of the vehicle. When increasing the number of the transmission gear ranges as mentioned above, a difference between the lowest range (i.e. first speed) and the highest range (e.g. sixth speed) becomes large, so that in the vehicle, the gear shift quality mentioned above is further lowered. In particular, taking into consideration of the automatic transmission applied to a utility vehicle and a heavy vehicle, this tendency becomes further significant in accordance that the difference between the gear shift rates becomes large.

On the other hand, an automatic transmission having such a structure that two shift clutches are provided between the input shaft and the output shaft is proposed and disclosed in Japanese Patent Application Laid-Open No. 4-262166. In this automatic transmission, one shift clutch transmits the power to transmission gear trains of second and fourth speed of even (numbered) transmission gear ranges, and another shift clutch transmits the power to the transmission gear trains of first, third and fifth speed of odd (numbered) transmission gear ranges, whereby the gear shift is carried out by changing between two gear shift clutches, that is, switching the gear shift. For example, at a time of shifting up to the second speed from the first speed, since the gear shift clutch in a side of the even range is in a disconnected state. Thus the synchronizer for the second speed of the even range previously operates a selectively operable synchrosleeve in a shifting manner so as to engage the second speed synchronizer with the output shaft. And then the synchronizer changes the gear shift clutch in the side of the odd range constituting the transmission gear train of the first speed and the gear shift clutch in the side of the even range, thereby achieving the gear shift operation.

Further, in this transmission, two gear shift clutches are provided between the engine and the input shaft, and the transmission gear trains are roughly classified into transmission gear trains of odd or even gear shift ranges connected so as to be capable of transmitting the power from one clutch to the first input shaft, and transmission gear trains of odd or even gear shift ranges connected so as to be capable of transmitting the power from another clutch to the second input shaft. Further, the synchronizer is provided in each of the transmission gear trains.

However, since this automatic transmission shift gears by alternately switching the shift clutch in the odd range side and the shift clutch in the even range side, it is necessary to shift the gears via the transmission gear range on the way in the case of shifting up from the first speed to the fifth speed. Accordingly, it is hard to shift the gears in a jumped (or skipped) manner such as the gear shift from the odd range to the odd range and the gear shift from the even range to the even range, for example, the gear shift from the first speed to the third speed and the gear shift from the second speed to the fourth speed. In this case, since the speed increase and the speed reduction are carried out while passing via the transmission gear range on the way, there are generated problems such that a time for shifting gears becomes generally long, the driver feels a stress in the gear shift during an acceleration for passing over, and the like. In particular, a difference between an intention of the driver and a motion of the vehicle is frequently generated at a time of jumped kick-down gear shift from the maximum transmission gear range. This phenomenon appears as a significant phenomenon in a travel on a mountain road having a lot of curves and ups and downs or for a vehicle having a comparatively small displacement and less power.

On the contrary, since the structure of the transmission gear train is the structure which is clearly classified into the odd range train group and the even range train group, there is generated a problem that a design freedom is not obtained in the arrangement of the gears in the transmission main body and the layout of the operation system. In particular, if it is desired to wholly and appropriately use the basic structure of the manual transmission, there is generated the problem that the same mechanism can be used only by arranging the manual transmission in such a manner that the transmission gear trains are separated into the even transmission gear trains and the odd transmission gear trains.

SUMMARY OF THE INVENTION

An object of the present invention is to achieve a sporty gear shift which is excellent in response by widely improving a normal gear shift quality and a jump (or skipped) gear shift quality at a time of automatically shifting gears.

Another object of the present invention is to more improve a freedom in a structure of gear trains and a layout of main components of an automatic transmission.

The other object of the present invention is to inhibit the automatic transmission from becoming long and large in size by concentrically housing a plurality of bypass clutches in a side of one end portion of an input shaft, and to make it possible to effectively lubricate the bypass clutch.

The automatic transmission according to the present invention, it is provided with an input shaft in which a plurality of drive gears are provided, and with an output shaft in which a plurality of driven gears constantly engaging with the drive gears are provided, comprising: an input clutch provided between a crankshaft of an engine and the input shaft to switch an engine power transmission and a disconnection to said input shaft; a switching mechanism selectively switching a transmission gear train to transmit the power from a plurality of transmission gear trains formed by the drive gears and the driven gears; a plurality of bypass clutches provided in an end portion of the input shaft so as to be able to transmit the power to the respective transmission gear trains and transmitting different torque capacities from each other to the output shaft; and bypass clutch control means for transmitting the engine power to the output shaft via at least any one of said plurality of bypass clutches at a time of shifting gears, wherein said plurality of bypass clutches and the input clutch are arranged in series between the engine and the input shaft.

The automatic transmission according to the present invention further comprises: a first bypass clutch operating at a time of shifting a transmission gear train in a first transmission gear train group constituted by a plurality of transmission gear trains in a side of a low speed range; and a second bypass clutch operating at a time of shifting a transmission gear train in a second transmission gear train group constituted by a plurality of the transmission gear trains in the side of a high speed range.

In the automatic transmission according to the present invention, the first bypass clutch is connected to any one of the drive gears constituting the first transmission gear train group; the second bypass clutch is connected to any one of the drive gears constituting said second transmission gear train group; and the respective drive gears are arranged to contact with the bypass clutches.

In the automatic transmission according to the present invention, a damper for damping engine vibration is arranged between the crankshaft of the engine and the input clutch.

In the automatic transmission according to the present invention, a fluid torque converter provided with a lockup mechanism or a fluid coupling is arranged between the crankshaft of the engine and the input clutch.

In accordance with an automatic transmission of the present invention, it is possible to considerably reduce a gear shift shock so as to achieve a smooth gear shift quality by arranging a plurality of bypass clutches between the engine and the input shaft and properly using the bypass clutch for carrying out the torque transmission in correspondence to the transmission gear range. When shifting the gears, it is possible to carry out a jumped (or skipped) gear shift at the driver's discretion by engaging the bypass clutch only for a predetermined time, and it is possible to improve a response ability of the transmission, whereby a sporty gear shift can be achieved.

Since a start clutch and a plurality of the bypass clutches are continuously arranged in series at an end portion of the input shaft, it is possible to secure an improved mountability while avoiding the transmission from being large in size and long, it is possible to use common elements of the automatic and manual transmissions, and it is possible to more improve the design freedom in a layout of the main components.

Further, since the input and bypass clutches are continuously arranged in series at the end portion of the input shaft, it is possible to synthetically supply a fluid or a lubricating oil for operating the respective clutches, and it is possible to improve a gear shift response.

DESCRIPTION OF THE PREFERRED EMBODIMENTS

Figure 1:
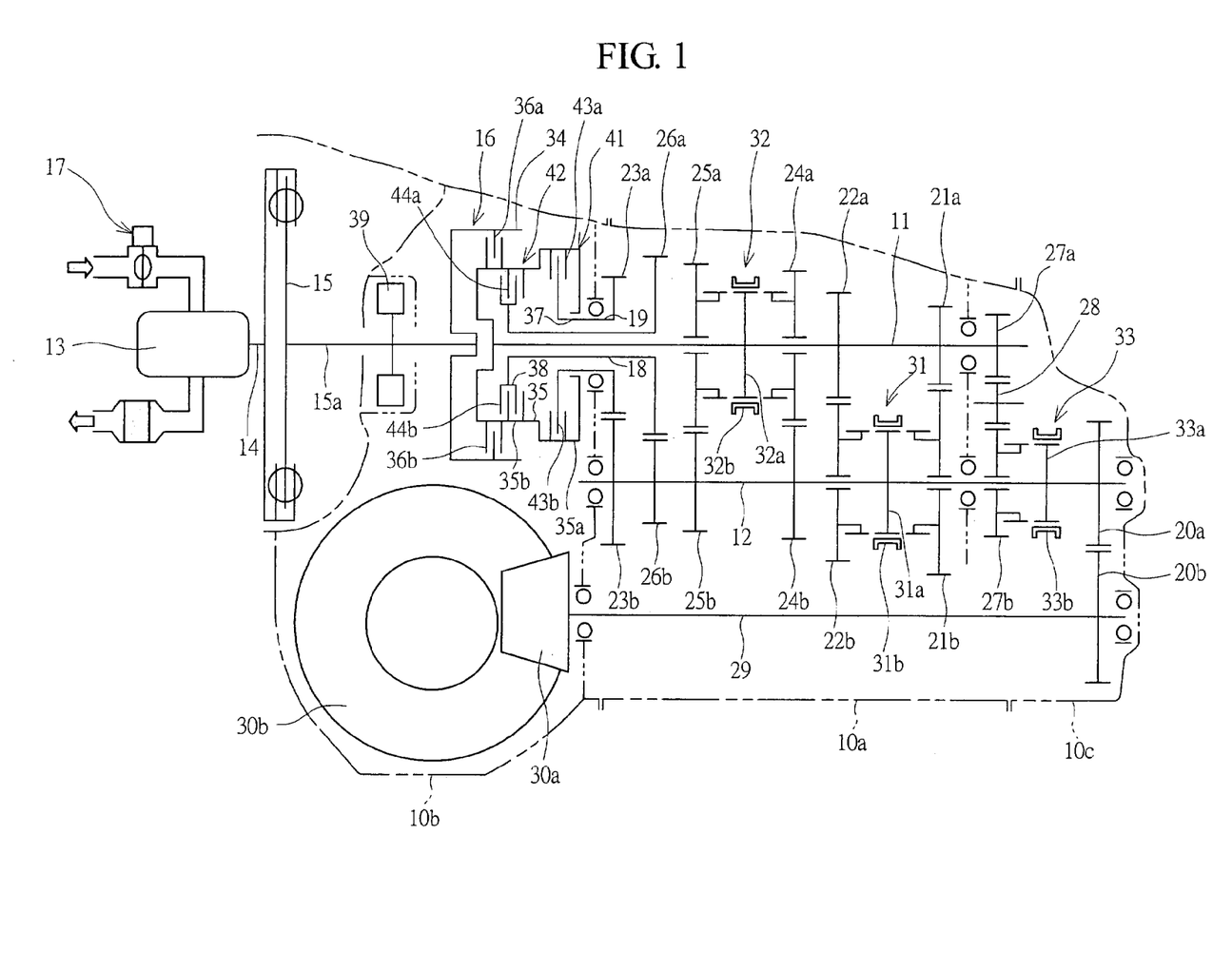
FIG. 1 is a skeleton view showing an automatic transmission corresponding to one embodiment in accordance with the present invention.

As shown if FIG. 1, an automatic transmission has an input shaft 11 and an output shaft 12, and these shafts 11, 12 are contained within a transmission case 10a so as to be in parallel with each other. A clutch case 10b is mounted on one end side of the transmission case 10a, and an extension case 10c is mounted on another end side thereof.

A damping (or attenuating) apparatus, that is, a damper 15 is arranged between a crankshaft 14 and an input shaft 11 of an engine 13. And an input clutch, that is, a start clutch 16 is arranged between the damper 15 and the input shaft 11. Accordingly, when the start clutch 16 is in an engaged state, an engine power is damped in vibration by the damper 15 so as to be transmitted to the input shaft 11, and the engine power is not transmitted by releasing the engagement. Further, the start clutch 16 is formed by a multiple disc type wet friction clutch, and has a function of forming a half-clutch state, that is, a slip state so as to smoothly transmit the engine power when a vehicle starts, in addition to a function of transmitting the power and disconnecting the power. In this case, a single disc clutch may be used in place of the multiple disc clutch.

The engine 13 is provided with an electronic control throttle 17 for adjusting an engine torque and an engine speed, and an engine control is normally carried out by opening and closing the electronic control throttle 17 on the basis of an output signal from the electronic control apparatus in correspondence to a pedaling (or stepping) amount of an accelerator pedal (not shown). Further, the electronic control throttle 17 opens and closes depending on this situation, not based on the pedaling amount of the accelerator pedal, but based on a preset map or the like in accordance with a detected driving condition, whereby the engine control is carried out.

A hollow inner bypass shaft 18 is rotatably mounted on an outer side of the input shaft 11 in an engine side of the input shaft 11, and a hollow outer bypass shaft 19 is rotatably mounted to an outer side of the inner bypass shaft 18.

The input shaft 11 is integrally provided with a first speed drive gear 21a and a second speed drive gear 22a, and is rotatably provided with a fourth speed drive gear 24a and a fifth speed drive gear 25a. Further, the outer bypass shaft 19 is integrally provided with a third speed drive gear 23a, and the inner bypass shaft 18 is integrally provided with a sixth speed drive gear 26a. On the other hand, the output shaft 12 is rotatably provided with a first speed driven gear 21b and a second speed driven gear 22b, and third speed to six speed driven gears 23b to 26b are fixed to the output shaft 12. The respective drive gears and the respective corresponding driven gears are constantly engaged with each other, whereby the transmission gear trains for the forward moving ranges from the first speed to the sixth speed are formed. When the transmission gear train for carrying out the power transmission is selected among a plurality of transmission gear trains, the automatic transmission establishes the gear shift range corresponding to the transmission gear train.

A drive gear 27a for reverse is integrally provided in the input shaft 11, a driven gear 27b for reverse is rotatably provided in the output shaft 12, and an idler gear 28 is engaged with both of the gears 27a and 27b. A drive shaft 29 is rotatably provided within the transmission case 10a in parallel with the output shaft 12, and the output shaft 12 is connected to the drive shaft 29 via a gear 20a fixed to the output shaft 12 and via a gear 20b fixed to the drive shaft 29 and engaged with the gear 20a. A drive pinion 30a fixed to the drive shaft 29 is engaged with a ring gear 30b of a front differential apparatus.

The output shaft 12 is provided with a first switching mechanism 31 which selectively switches the transmission gear train to any one of the first speed and the second speed, and the input shaft 11 is provided with a second switching mechanism 32 which selectively switches the transmission gear to any one of the fourth speed and the fifth speed. Further, the output shaft 12 is provided with a third switching mechanism 33 which selectively switches the backward moving gear train to a backward moving state and a neutral state. In this case, if the structure is made such that the drive gears 21a and 22a are rotatably provided in the input shaft 11, and the driven gears 21b and 22b are integrally provided in the output shaft 12, the first switching mechanism 31 can be provided in the input shaft 11. In the same manner, the structure may be made such that the second switching mechanism 32 is provided in the output shaft 12, the structure may be also made such that both of the switching mechanisms 31 and 32 are provided in the input shaft 11 or the output shaft 12, or the structure may be further made such that the third switching mechanism 33 is provided in the input shaft 11.

The first switching mechanism 31 has a synchro-hub 31a which is arranged between the first and second speed driven gears 21b and 22b and is fixed to the output shaft 12, and a synchro-sleeve 31b which is constantly engaged with the synchro-hub 31a, is set to the first speed by engaging the synchro-sleeve 31b with the driven gear 21b, and is set to the second speed by engaging the synchro-sleeve 31b with the driven gear 22b. The second switching mechanism 32 has a synchro-hub 32a which is arranged between the fourth and fifth speed drive gears 24a and 25a and is fixed to the input shaft 11, and a synchro-sleeve 32b which is constantly engaged with the synchro-hub 32a, is set to the fourth speed by engaging the synchro-sleeve 32b with the drive gear 24a, and is set to the fifth speed by engaging the synchro-sleeve 32b with the drive gear 25a. The third switching mechanism 33 has a synchro-hub 33a which is arranged adjacent to the reverse driven gear 27b and is fixed to the output shaft 12, and a synchro-sleeve 33b which is constantly engaged with the synchro-hub 33a, and is set to the reverse range by engaging the synchro-sleeve 33b with the driven gear 27b. Each of the switching mechanisms 31 to 33 is formed by a synchro-mesh mechanism, that is, a synchronous engagement mechanism, however, the structure may be made such that each of the switching mechanisms employs a dog clutch switching mechanism or a selectively sliding type switching mechanism.

This automatic transmission has six forward speed gear ranges, the first to third speed ranges and the backward moving range constitute a transmission gear range group in a side of a low speed range, and the fourth to sixth speed ranges constitute a transmission gear range group in the side of a high speed range. As described above, the first to sixth speed gear ranges are separated into two groups comprising the low speed range side and the high speed range side.

Figure 2:
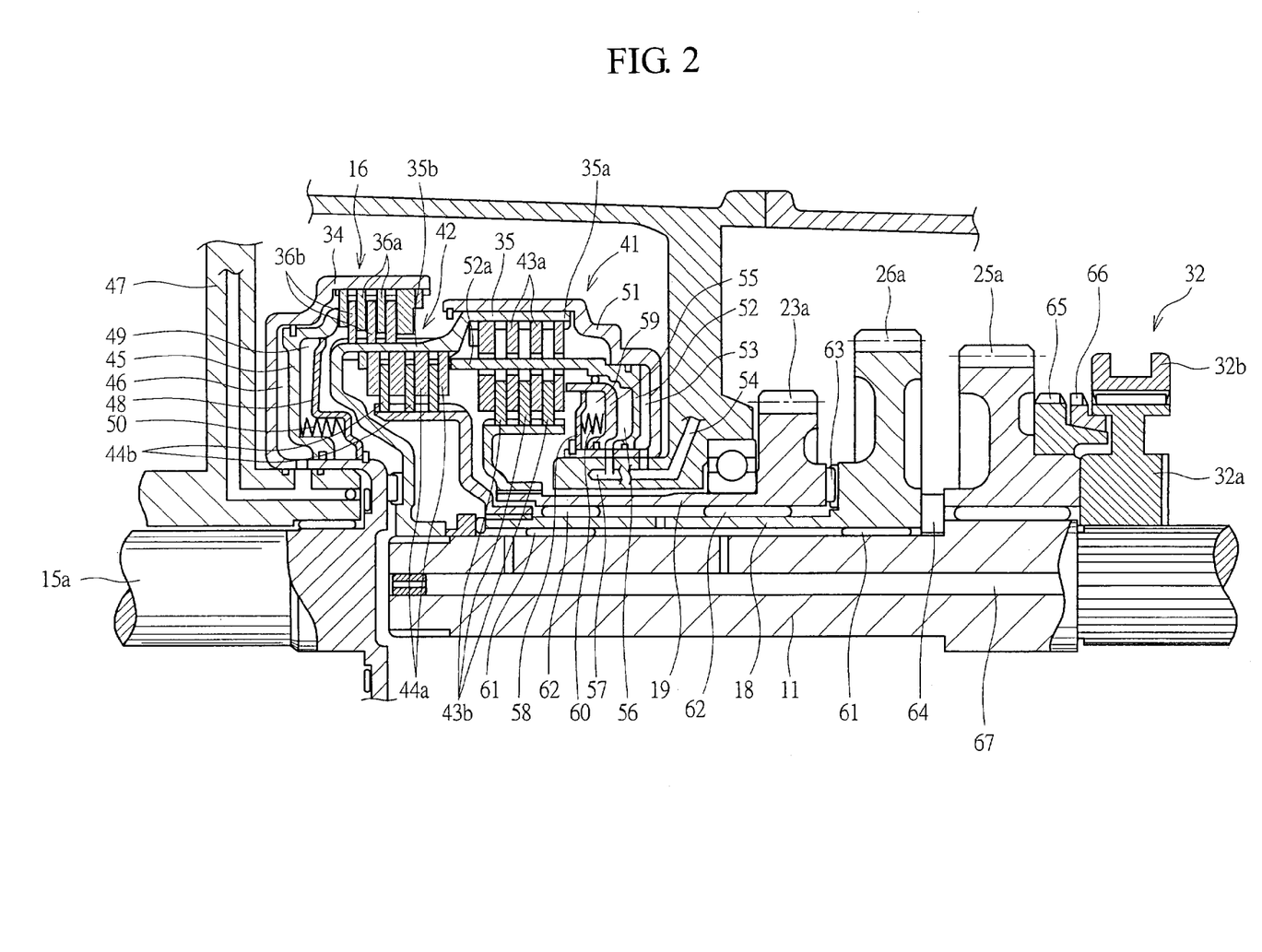
FIG. 2 is a cross sectional view showing a part of a starting clutch and two bypass clutches shown in FIG. 1 in an enlarged view.

A start clutch 16 has an outer cylinder body 34 fixed to an output shaft 15a of a damper 15, and an inner cylinder body 35 fixed to the input shaft 11, a clutch disc 36a is provided in an inner portion of the outer cylinder body 34, and a clutch disc 36b engaged and contacted with the clutch disc 36a is provided to an outer portion of the inner cylinder body 35. A leading end portion 35a of the inner cylinder body 35 has a larger diameter than a diameter of a base end portion 35b, the leading end (or edge) portion 35a is provided with a first bypass clutch 41 which switches the start clutch 16 and the drive gear 23a into a connection state and a disconnection state, and the base end portion 35b is provided with a second bypass clutch 42 which switches the start clutch 16 and the drive gear 26a into a connection state and a disconnection state.

Accordingly, the first bypass clutch 41 establishes a gear ratio in a side of a highest speed range in the low speed range side transmission gear train group so as to transmit a torque from the input shaft 11 to the output shaft 12, and the second bypass clutch 42 establishes the gear ratio in the side of a highest speed range in the high speed range side transmission gear train group so as to transmit the torque. As described above, the bypass clutch 41 constitutes a third speed transmission gear train, and when the third speed is selected, the bypass clutch 41 is in a connection state. In the same manner, the bypass clutch 42 constitutes a sixth speed transmission gear train, and when the sixth speed is selected, the bypass clutch 42 is in a connection state. Further, since the respective bypass clutches 41 and 42 constitute the transmission gear trains of the different gear shift ratios from each other, the different torque from each other are transmitted from the input shaft 11 to the output shaft 12.

The first bypass clutch 41 has a clutch disc 43a which is provided to an inner portion of the leading end portion 35a, and a clutch disc 43b which is provided in the clutch hub 37 fixed to the outer bypass shaft 19 so as to be engaged and contacted with the clutch disc 43a. The second bypass clutch 42 has a clutch disc 44a which is provided to an inner portion of a small diameter portion, and a clutch disc 44b which is provided on the clutch hub 38 fixed to the inner bypass shaft 18 so as to be engaged and contacted with the clutch disc 44a. As shown in FIG. 2, the first bypass clutch 41 is assembled within the leading end portion 35a having the larger diameter than the diameter of the base end portion 35b, and it is possible to set an engagement area between the clutch discs 43a and 43b approximately the same as an engagement area of the clutch discs 44a and 44b. Each of the bypass clutches 41 and 42 is a multiple disc type wet friction clutch, and an engaging operation and a disengaging operation are carried out on the basis of a fluid from an oil pump 39 driven by the engine via the damper 15. In this case, the structure may be made such that the oil pump 39 is driven by an electric motor.

In the automatic transmission shown in FIG. 2, the structure is made such that each of the bypass clutches 41 and 42 transmits the power in the third speed and the sixth speed by directly connecting the first bypass clutch 41 to the third speed gear 23a and directly connecting the second bypass clutch 42 to the sixth speed gear 26a. However, the structure may be made such that the third speed and six speed drive gears are provided in the input shaft 11 with (operating) the respective bypass clutches 41 and 42 only at the time of a gear shift. In this case, the bypass gears for carrying out the power transmission only at the time of the gear shift are respectively mounted on the bypass shafts, and the third speed and sixth speed transmission gear trains are shifted so as to transmit the power by the switching mechanism, so that the gear shift is carried out while transmitting the torque via the bypass gear by operating the bypass clutches 41 and 42 at the time of operating the switching mechanism. In this case, the gear ratios of the respective bypass clutches are set to the same or similar gear ratio as the gear ratio in the high speed range side in the respective two grouped transmission gear train groups.

In FIG. 2, there is shown in an enlarged portion of the start clutch 16 and the bypass clutches 41 and 42 illustrated in FIG. 1. A hydraulic plunger 45 is assembled within the outer cylinder body 34 so as to freely move in an axial direction, and when supplying the fluid from an oil passage 47 to an oil chamber 46 defined and formed by the hydraulic plunger 45 and the outer cylinder body 34, the hydraulic plunger 45 frictionally engages the clutch discs 36a and 36b of the start clutch 16, and the start clutch 16 becomes in a connection state. In order to apply a spring force in a returning direction to the hydraulic plunger 45, a return spring 50 is assembled in a cancel fluid chamber 49 defined and formed by a partition wall 48 fixed within the outer cylinder body 34 and the hydraulic plunger 45. The fluid received within the cancel fluid chamber 49 applies a centrifugal hydraulic pressure in a returning direction to the hydraulic plunger 45 in correspondence to the rotation of the outer cylinder body 34.

As shown in FIG. 2, a hydraulic cylinder 51 is mounted on an outer periphery of the leading end portion of the inner cylinder body 35. A hydraulic plunger 52 is assembled within the hydraulic cylinder 51 so as to freely move in an axial direction, and a plurality of operation rod portions 52a provided in the hydraulic plunger 52 extend to the second bypass clutch 42 through the clutch disc 43a. When supplying the fluid from an oil passage 54 to an oil chamber 53 defined and formed by the hydraulic plunger 52 and the hydraulic cylinder 51, the hydraulic plunger 52 frictionally engages the clutch discs 44a and 44b of the second bypass clutch 42 and the second bypass clutch 42 becomes in a connection state.

A hydraulic plunger 55 is assembled in an inner portion of the hydraulic plunger 52 so as to freely move in the axial direction, and when supplying the fluid from an oil passage 57 to an oil chamber 56 defined and formed by the hydraulic plunger 55 and the hydraulic plunger 52, the hydraulic plunger 55 frictionally engages the clutch discs 43a and 43b of the first bypass clutch 41, and the first bypass clutch 41 becomes in a connection state. In order to apply a spring force in a returning direction to the respective hydraulic plungers 52 and 55, a return spring 60 is assembled in a cancel fluid chamber 59 defined and formed by a partition wall 58 fixed within the hydraulic cylinder 51 and by the hydraulic plunger 55. The fluid received within the cancel fluid chamber 59 applies the centrifugal fluid pressure in a returning direction to the hydraulic plungers 52 and 55 in correspondence to the rotation of the inner cylinder body 35.

As shown in FIG. 2, a needle bearing 61 is assembled between the input shaft 11 and the inner bypass shaft 18, and a needle bearing 62 is assembled between the inner bypass shaft 18 and the outer bypass shaft 19. Further, a thrust bearing 63 is assembled between the drive gear 23*a* and the drive gear 26*a*, a thrust bearing 64 is assembled between the drive gear 26*a* and the drive gear 25*a*, and each of the input shaft 11 and the bypass shafts 18 and 19 can freely rotate independently. In order to supply the lubricating fluid to each of the bearings 61 to 64, an oil passage 67 is formed in the input shaft 11.

In FIG. 2, there is shown a part of the second switching mechanism 32. A spline 65 is fixed to the drive gear 25*a*, a synchronizer ring 66 is attached to the spline 65, and when the synchro-sleeve 32*b* engages with the spline 65 of the drive gear 25*a* via the synchronizer ring 66, the fifth speed transmission gear train is switched to the power transmission state. With respect to the other gears 24*a*, 21*b*, 22*b* and 27*b*, a spline and a synchronizer ring are provided in the same manner.

As shown in FIGS. 1 and 2, the start clutch 16 and two bypass clutches 41 and 42 are arranged in the end portion of the input shaft 11, and since these clutches 16, 41 and 42 are formed in series, that is, continuously adjacent to each other, it is possible to inhibit (or avoid) the transmission unit from becoming long and large in size, and it is possible to commonly use the inner cylinder body 35 as the clutch hub of the start clutch 16 and as the clutch drums of two bypass clutches 41 and 42. Further, since it is possible to use the transmission case 10*a* and the parts such as the input shaft 11 and the like assembled in the inner portion of the transmission case 10*a* as the parts of the manual transmission as they are, it is possible to more improve a design freedom in a layout of the main constituting parts, and it is possible to commonly use a lot of parts in the automatic transmission and the manual transmission. Further, since the respective clutches 16, 41 and 42 are arranged in series, it is possible to concentrically supply the fluid and the lubricating oil for operating the respective clutches, and it is possible to improve a gear shift response.

Figure 3:
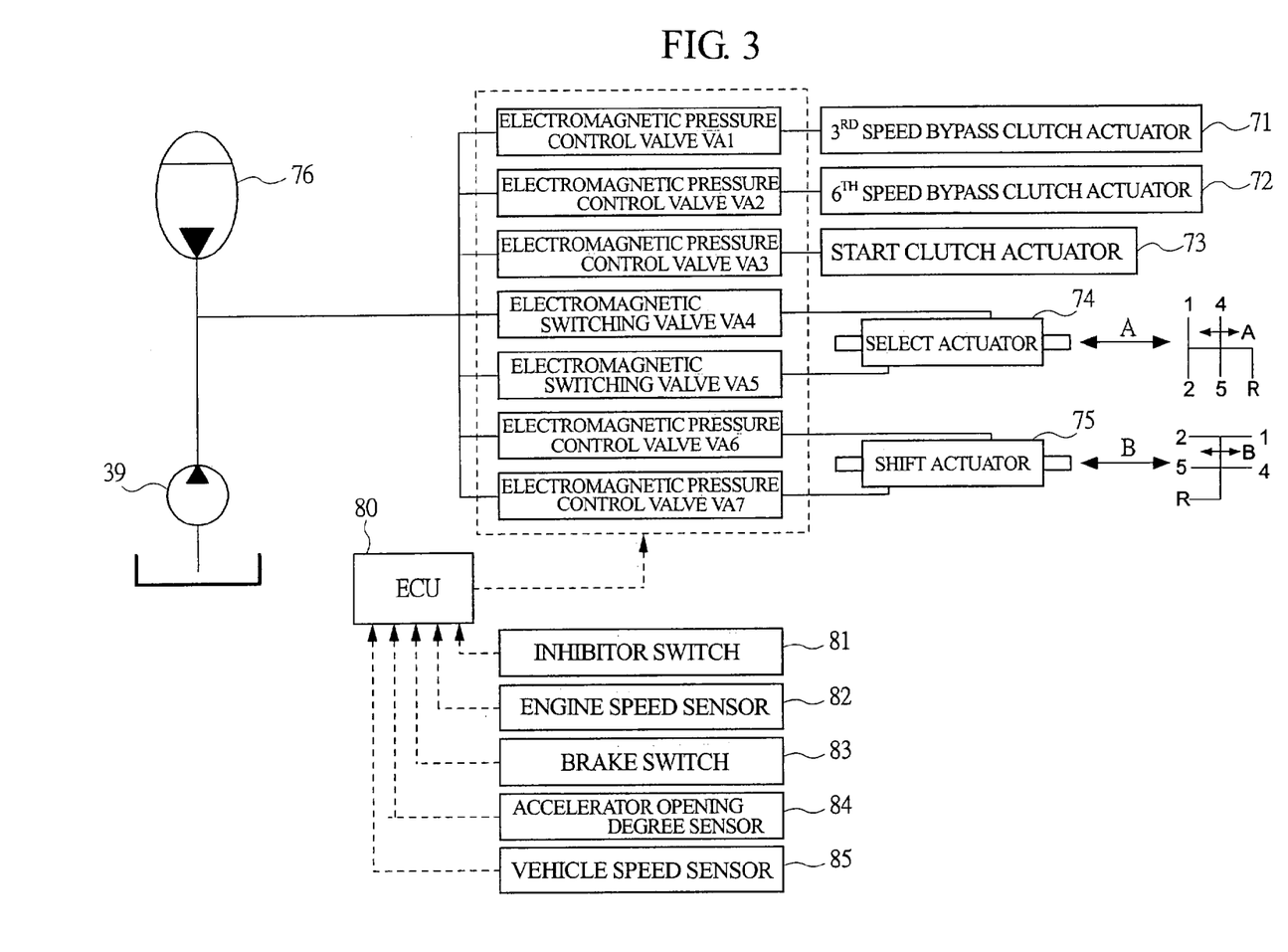
FIG. 3 is a block diagram showing a hydraulic control circuit for controlling the automatic transmission.

As shown in FIG. 3, the automatic transmission has a third speed bypass clutch actuator 71 for operating the first bypass clutch 41, a sixth speed bypass clutch actuator 72 for operating the second bypass clutch 42, and a start clutch actuator 73 for operating the start clutch 16. Further, the automatic transmission has a select actuator 74 and a shift actuator 75 in order to switch into the transmission gear train carrying out the power transmission among a plurality of transmission gear trains so as to select a predetermined gear shift range. The switching operation of the forward moving ranges of the first speed, the second speed, the fourth speed and the fifth speed, and the backward moving range, by converting the linear oscillations of two actuators 74 and 75 into the switching movements of the respective switching mechanisms 31 to 33 mentioned above via direction changing mechanism (not shown).

As shown in FIG. 3, the fluid from the oil pump 39 is supplied to the third speed bypass clutch actuator 71 via an electromagnetic pressure control valve VA1, to the sixth speed bypass clutch actuator 72 via an electromagnetic pressure control valve VA2, and to the start clutch actuator 73 via an electromagnetic pressure control valve VA3 respectively. Further, the fluid is supplied to the select actuator 74 via electromagnetic switch valves VA4 and VA5, and the fluid is supplied to the shift actuator 75 via electromagnetic pressure control valves VA6 and VA7. This select actuator 74 drives a lever in a direction shown by an arrow A in FIG. 3, and drives the lever in the direction shown by an arrow B in FIG. 3.

While the shift actuator 75 is controlled by the electromagnetic pressure control valves VA6 and VA7, the select actuator 74 can be controlled by the electromagnetic switch valves VA4 and VA5 because the switching operation (a select operation) in the direction A is sufficiently carried out by simply pushing until striking against a dead stop (or end) by a large operating force. On the contrary, since the switching operation (a shift operation) in the direction B requires a synchronism by the synchro, and an excessive operating force generates an abrasion of the synchro ring, it is required to control the operating force itself, whereby the shift actuator 75 is controlled by the electromagnetic pressure control valves VA6 and VA7. Further, since the shift operating force in the direction B is larger than the select operating force in the direction A, a loud noise tends to be generated at the time of being brought into contact with the dead stop, and a countermeasure of an operating sound is required. Thus, the operating period is separated into three stages in the shift operation by the shift actuator 75, and such requirements as a rapid shift operation, a protection of the synchro ring and a reduction of the operating sound are satisfied. That is, the operating force is adjusted in such a manner as to be strong at an initial time, middle at the synchronous time, and weak at an end time. Therefore, with respect to the shift actuator 75, the operation is carried out by using the electromagnetic pressure control valve capable of regulating the supplied hydraulic pressure in place of the control valve only turning on and off the hydraulic pressure simply.

The respective valves VA1 to VA7 are controlled on the basis of signals from an electronic control unit ECU 80, and the fluid supplied from the oil pump 39 is partly stored in an accumulator 76. A gas such as nitrogen or the like is charged within a sealed vessel of the accumulator 76, the gas is compressed by pressing the fluid thereinto, and a pressure energy of the fluid is converted into a pressure energy of the gas so as to be stored. That is, a line pressure is stored in the accumulator 76, and a stabilization of the line pressure is secured. Further, even in the case that such a trouble as a failure of the pump, an oil leakage or the like is generated due to the pressure stored in the accumulator 76, a minimum emergency operation can be secured, for example, by forcibly shift changing the transmission gear range to the third speed. In this case, the structure may be made such that the oil pump 39 may be driven by an electric motor.

Signals are input to the control unit ECU 80 from various kind of sensors such as an inhibitor switch 81, and an engine speed sensor 82, a brake switch 83, an acceleration opening degree sensor 84 and a vehicle speed sensor 85 and the like. The control unit ECU 80 detects a position of the select lever on the basis of the signal from the inhibitor switch 81, detects an engine speed on the basis of the signal from the engine speed sensor 82, detects an opening degree of a throttle valve on the basis of the signal from the acceleration opening degree sensor 84, and detects a vehicle speed on the basis of the signal from the vehicle speed sensor 85. Further, the control unit ECU 80 detects a drive condition of the vehicle on the basis of these detection data, and sends (or transmits) a control signal to the respective valves VA1 to VA7. Accordingly, the control unit ECU 80 functions as bypass clutch control means.

Next, a description will be given of an operation of two bypass clutches 41 and 42. First, a description will be given of an up-shift operation. The first bypass clutch 41 is operated at a time of shifting gears in the transmission gear train group in the low speed range side such as from the first speed to the second speed, from the second speed to the third speed, and the like. For example, at the time of shifting up the gears from the first speed to the second speed, a traveling (or running) state is detected on the basis of the information such as the acceleration opening degree, the vehicle speed, the engine speed, the transmission gear position and the like, the first bypass clutch 41 is connected for a predetermined time on the basis of a preset program, and the torque is transmitted from the input shaft 11 to the output shaft 12 via the bypass clutch 41. Accordingly, a decline of the torque is reduced at a time of switching the switching mechanism 31 at the gear shift time, and the gear shift shock is reduced. Further, at the time of shifting up gears from the second speed to the third speed, the engine torque is reduced by controlling so as to close the electronic control throttle 17 while synchronizing with the control of the first bypass clutch 41. It is possible to reduce the gear shift shock by controlling the bypass clutch 41 and the electronic control throttle 17 in the manner mentioned above.

The second bypass clutch 42 is operated at the time of shifting the gears in the transmission gear train group in the high speed range side such as from the third speed to the fourth speed, from the fourth speed to the fifth speed, from the fifth speed to the sixth speed, and the like. For example, at the time of shifting up the gears from the third speed to the fourth speed, and from the fourth speed to the fifth speed, a traveling state is detected, the second bypass clutch 42 is connected for the predetermined time on the basis of the preset program, and the torque is transmitted from the input shaft 11 to the output shaft 12 via the bypass clutch 42. Accordingly, a decline (or decrease) of the torque is reduced at the time of shifting the gears, and the gear shift shock is reduced. Further, at the time of shifting up the gears from the fifth speed to the sixth speed, the engine torque is reduced by controlling so as to close the electronic control throttle 17 while controlling the second bypass clutch 42, whereby it is possible to reduce the gear shift shock.

Figure 4:
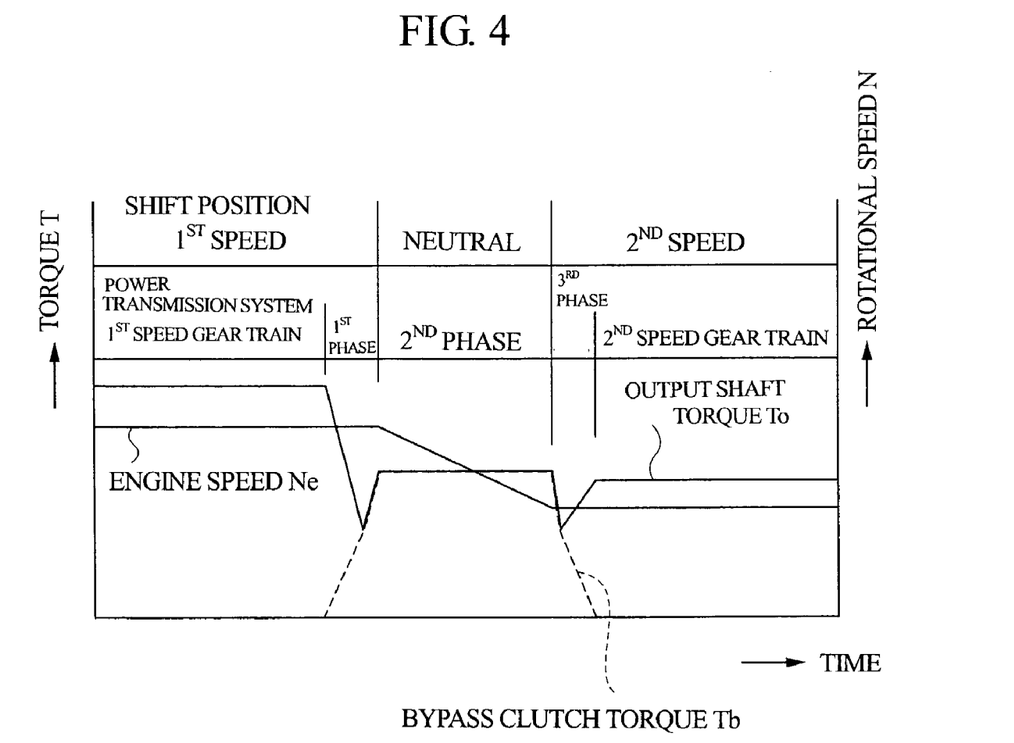
FIG. 4 is a time chart showing a change of an engine speed and a torque of an output shaft at a time of shifting up from a first speed to a second speed.

FIG. 4 is a time chart showing a change in an engine speed Ne and a torque T0 of the output shaft 12 at the time of shifting up the gears from the first speed to the second speed. In FIG. 4, a shift position shows an engagement position of the synchro-sleeve 31b, the synchro-sleeve 31b moves from a first speed position at which the synchro-sleeve 31b engages with the first speed driven gear 21b via a spline and a synchronizer ring which are not illustrated, to a second position at which the synchro-sleeve 31b engages with the second speed drive gear 22a via a spline and a synchronizer ring which are not illustrated, via a neutral position. When the gear shift operation is carried out, the (control) hydraulic pressure is supplied to the hydraulic pressure chamber of the third speed bypass clutch actuator 71 in order to first operate the bypass clutch 41, from a state in which the power transmission is carried out via the first speed transmission gear train constituted by the drive gear 21a and the driven gear 21b. Accordingly, the state is changed to a first phase state in which the power transmission is carried out via two systems comprising the first speed transmission gear train and the third speed transmission gear train.

In this case, the first speed driven gear 21b and the third speed driven gear 23b are provided in the same output shaft 12, however, have different gear ratios from each other, and since the rotation of the third speed drive gear 23a is faster than the rotation of the first speed drive gear 21a in accordance with the relation of the gear shift rate, the torque corresponding to the engagement state is transmitted by the third speed transmission gear train by engaging the bypass clutch 41.

Next, the synchro-sleeve 31b becomes in a neutral state, that is, a second phase state, and under this state, the power is transmitted from the input shaft 11 to the output shaft 12 via the third speed transmission gear train constituted by the drive gear 23a and the driven gear 23b, that is, the bypass clutch 41, and the engine speed, that is, the rotation of the input shaft 11 is reduced and synchronized by controlling so as to close the electronic control throttle 17.

When moving the synchro-sleeve 31b from the neutral position to the state engaging with the second speed driven gear 22b at a time when the engine speed is reduced to the speed corresponding to the second speed, there is established a third phase state in which the power transmission is carried out via two systems comprising the second speed transmission gear train and the third speed transmission gear train. When draining the hydraulic pressure supplied to the third speed bypass clutch actuator 71 for the bypass clutch 41 so as to release the bypass clutch 41 under this third phase state, the up-shift to the second speed is completed. Accordingly, the power is transmitted from the input shaft 11 to the output shaft 12 via the second speed transmission gear train.

As described above, since the bypass clutch control and the engine control are simultaneously carried out at the time of shifting up, and the synchro-sleeve 31b engages with the second speed driven gear 22b when the engine speed is reduced to the speed corresponding to the second speed, the gear shift operation can be smoothly carried out without generating the gear noise. Further, since the structure is made such that the power transmission is carried out via the bypass clutch 41 when the synchro-sleeve 31b is at the neutral position, it is possible to reduce the decrease of the drive force, that is, the generation of the torque disconnection which generates a problem particularly at the time of shifting up from the first speed to the second speed, from the second speed to the third speed, and the like in which the drive force change is large. FIG. 4 shows the change of the engine speed and the torque at the time of shifting up from the first speed to the second speed, however, the up-shift operation to the other transmission gear ranges can be carried out in the same manner.

Figure 5A:
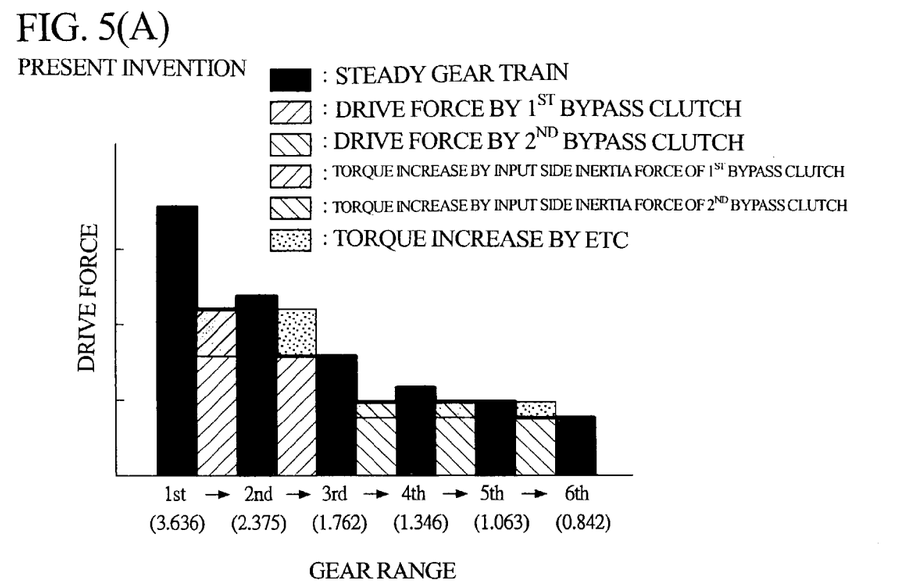
FIG. 5A is a characteristic graph showing a drive force transmitted from an input shaft to an output shaft in each of transmission gear ratios by the automatic transmission, and a drive force transmitted at a time of carrying out an up-shift operation.
Figure 5B:
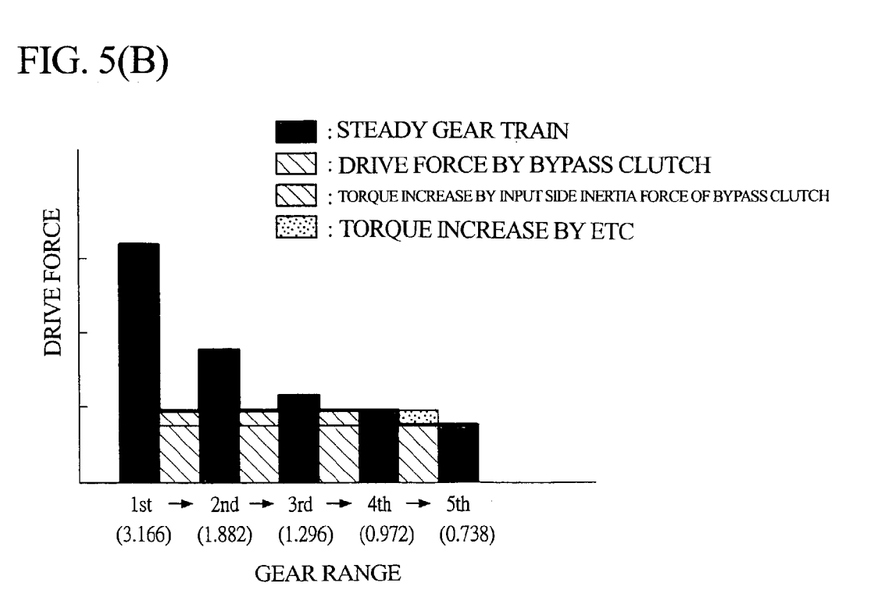
FIG. 5B is another characteristic graph showing the drive force transmitted from the input shaft to the output shaft in each of the transmission gear ratios by the automatic transmission for comparing with the embodiment shown in FIG. 5A, and a drive force transmitted at the time of carrying out the up-shift operation.

FIG. 5A is a characteristics property view showing a drive force which is transmitted from the input shaft 11 to the output shaft 12 in each transmission gear range by the automatic transmission shown in FIG. 1, and a drive force which is transmitted at the time when the up-shift operation is carried out. On the other hand, FIG. 5B shows the characteristics property view showing the drive force which is transmitted from the input shaft to the output shaft in each transmission gear range by the automatic transmission structured such that the fifth speed transmission gear train is connected by the bypass clutch, as shown in Japanese Patent Application Laid-Open No. 2000-65199 mentioned above, and the drive force which is transmitted at the time when the up-shift operation is carried out, as a comparative embodiment (or reference).

In the case of the comparative embodiment, a torque capacity transmitted from the input shaft to the output shaft via the bypass clutch corresponds to the fifth speed gear ratio. Accordingly, a large difference is generated with respect to the torque transmitted via the second speed transmission gear train even when adding the torque increase caused by the input side inertia force of the clutch to the torque transmitted via the bypass clutch at the time of shifting the gears from the first speed to the second speed. On the contrary, in the automatic transmission in accordance with the present invention, at the time of shifting up in the transmission gear train group in the side of the low speed range, the torque capacity corresponding to the third speed gear ratio is transmitted from the input shaft 11 to the output shaft 12 via the bypass clutch 41. Further, at the time of shifting up in the transmission gear train group in the side of the high speed range, the torque capacity corresponding to the six speed gear ratio is transmitted. Accordingly, the gear shift shock is reduced.

Further, a description will be given about a down shift operation. In a kick down of forcibly shifting down the transmission gear range by deeply pedaling (or stepping) the acceleration pedal at the normal down shift or accelerating for passing other vehicles, or the like, the running state is detected by various kinds of sensors, the first and second bypass clutches 41 and 42 are set to the connection state for the predetermined time in the down shift in accordance with the preset program, or the bypass clutches 41 and 42 or the start clutch 16 is disconnected as required, or the start clutch 16 or the like is set to a half-clutch state (a slip control state) as required. Accordingly, it is possible to reduce the shock at the time of shifting down, and it is possible to achieve a sporty driving where an idle running time is reduced by reducing the gear shift time.

Next, a description will be given about jump-up (skipped) shift and jump-down shift operations. For example, in the case of rapidly starting the vehicle in the state in which the accelerator pedal is pedaled down comparatively largely and returning the accelerator pedal rapidly in a state in which the vehicle speed is increased, the transmission gear range jumps up to the third speed from the first speed in accordance with an automatic transmission graph which is determined on the basis of parameters comprising the vehicle speed and the accelerator opening degree, whereby the up-shift is carried out. At this time, as mentioned above, even when the rapid drive force change is generated at the time of the gear shift by carrying out the gear shift operation and control, it is possible to reduce the gear shift shock and it is possible to smoothly carry out the gear shift operation.

As a further severe example, in the case of a three or four step jump-ups from the first speed to the fourth speed or the fifth speed, the gear shift can be carried out by the same operation as the normal one. In this case, since the transmission torque is different between the first and second bypass clutches 41 and 42, the smooth gear shift can be achieved by selectively using two bypass clutches as required, or controlling a slightly smaller torque capacity than that to be transmitted.

On the other hand, a description will be given of a jump-down shift. In the case that the accelerator pedal is fully pedaled down so as to pass over the comparatively slowly running vehicle, at the time of running on the climbing road at the middle speed under the maximum speed range, the vehicle kicks down in accordance with the gear shift graph. At this time, in some vehicle speed and accelerator opening degree, it is possible to carry out, for example, a two step jump-down shift from the sixth speed to the fourth speed, a three step jump-down shift from the sixth speed to the third speed, and a fourth step jump-down shift from the sixth speed to the second speed. In the down shift in this case, a smooth shift feeling can be obtained by the same operation as the normal down shift.

Figure 6:
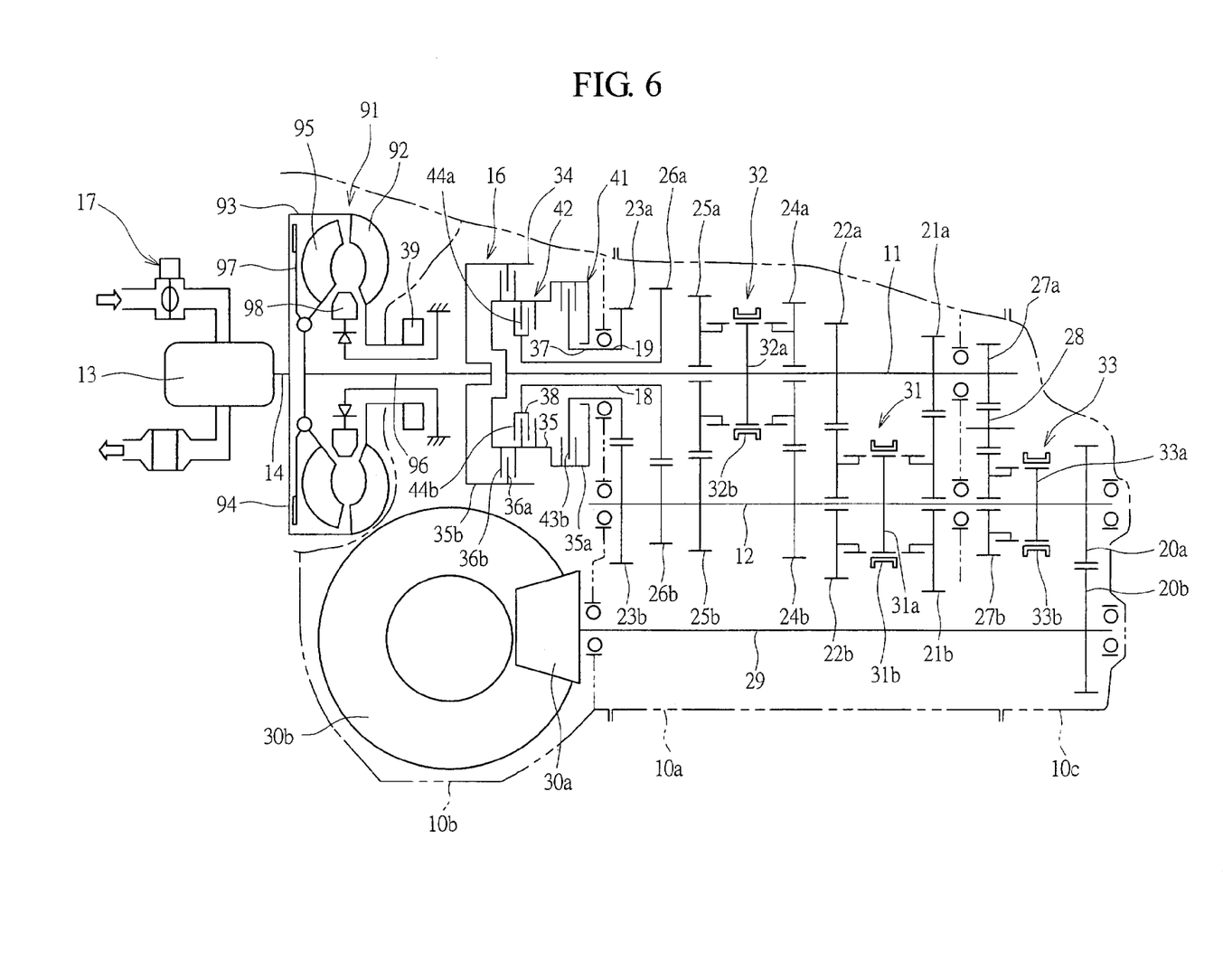
FIG. 6 is the skeleton view showing the automatic transmission corresponding to another embodiment.

FIG. 6 is a skeleton view showing the automatic transmission corresponding to another embodiment in accordance with the present invention. In the automatic transmission shown in FIG. 6, a torque converter 91 is provided in place of the damper 15 shown in FIG. 1, and the same reference numerals are attached to the common elements with those shown in FIG. 1.

As shown in FIG. 6, the torque converter 91 has an outer shell 93 provided with a pump impeller 92, and a front cover 94 fixed thereto, and the front cover 94 is fixed to the crankshaft 14 together with a drive plate (not shown). A turbine runner 95 is arranged so as to oppose to the pump impeller 92, the turbine runner 95 is connected to the start clutch 16 via a turbine output shaft 96, and a lockup clutch 97 is fixed to the turbine runner 95. A stator 98 is arranged between the pump impeller 92 and the turbine runner 95 and is supported by the transmission case 10*a* via a one-way clutch. As mentioned above, in the automatic transmission having the torque converter 91, the oil pump 39 is connected to the engine 13 via the outer shell 93. Even in this automatic transmission, the gear shift operation can be carried out in the same manner as the case shown in FIG. 1.

The illustrated automatic transmission is structured such as to be vertically arranged within the engine room, however, can be applied to the case that the engine 13 is transversely arranged, and can be applied not only to the FF vehicle and the FR vehicle, but also to a four-wheel drive vehicle. Further, the automatic transmission can be appropriately mounted to every kinds of the vehicles including a light and big-sized vehicle.

The present invention is not limited to the embodiments mentioned above, and it goes without saying that the present invention can be variously modified within the scope of the present invention. For example, the start clutch 16 and each of the bypass clutches 41 and 42 are constituted by the wet multiple disc clutch which appropriately adjusts the hydraulic pressure from the oil pump 39 corresponding to the hydraulic power source so as to supply the hydraulic pressure to each of the clutches, however, is not limited to the multiple disc type wet clutch. For example, it is possible to employ a system of controlling a magnetic power of an electromagnetic clutch by an electric current so as to connect the multi disc clutch by this force, or may employ a single disc clutch. Accordingly, it goes without saying that the means is not limited.

Further, a fluid coupling may be provided in place of the torque converter. In the case of using the fluid coupling or the torque converter, the structure is made such that a drag torque exerts no influence on an internal switching mechanism of the transmission by disconnecting the start clutch 16.

Further, in the embodiments, two bypass clutches 41 and 42 are provided, however, in the case that the number of the transmission gear ranges is increased in comparison with the illustrated case, it is possible to correspond thereto by increasing the number of the bypass clutches. For example, in the case of an eight range gear shift, the structure may be made such that a third bypass clutch is provided, and in the case of having an extra low range, it corresponds to a gear ratio for an emergency escape, and a difference in gear ratio between the extra low range and the normal first speed gear is increased. Accordingly, the structure may be made such that further the other bypass clutch is provided therebetween.

In accordance with the present invention, it is possible to widely reduce the gear shift shock so as to achieve (or improve) a smooth gear shift quality by providing with a plurality of the bypass clutches between the engine and the input shaft, and properly using the bypass clutch carrying out the torque transmission in correspondence to the transmission gear range. It is possible to carry out the jump gear shift at the driver's discretion (or intention) by engaging the bypass clutch only for the predetermined time at the time of shifting the gears, and it is possible to improve the response of the transmission, whereby it is possible to achieve the sporty gear shift.

Since the start clutch and a plurality of the bypass clutches are continuously arranged in the end portion of the input shaft, it is possible to secure an improved mountability while preventing the transmission from being large in the size and length, it is possible to use the common parts of the automatic transmission as the parts of the manual transmission as they are, and it is possible to more improve the design freedom in layout of the parts.

Further, since the input clutch and the bypass clutch are continuously (or integrally) arranged in the end portion of the input shaft, it is possible to concentrically supply the fluid or the lubricating fluid for operating the respective clutches, and it is possible to improve the gear shift response.

The entire disclosure of Japanese Patent Application No. 2002-117071 filed on Apr. 19, 2002 including specification, claims, drawings and summary are incorporated herein by reference in their entirety.

What is claimed is:

1. An automatic transmission provided with an input shaft having a plurality of drive gears and with an output shaft having a plurality of driven gears constantly engaging with said drive gears, comprising:
   an input clutch provided beneath a crankshaft of an engine and said input shaft to connect an engine power with said transmission and to disconnect from said input shaft;
   a switching mechanism for selectively switching a transmission gear train to transmit the power among a plurality of transmission gear trains formed by said drive gears and said driven gears;
   a plurality of bypass clutches provided in an end portion of said input shaft to transmit the power to the respective transmission gear trains and to transmit different torque capacities from each other to said output shaft; and
   bypass clutch control means for transmitting the engine power to said output shaft via at least one of said plurality of bypass clutches at a time of shifting gears;
   wherein said plurality of bypass clutches and said input clutch are arranged in series between the engine and said shaft.

2. The automatic transmission according to claim 1, further comprising:
   a first bypass clutch for operating at a time of shifting a transmission gear train in a first transmission gear train group constituted by a plurality of transmission gear trains in a side of a low speed range; and
   a second bypass clutch for operating at the time of shifting the transmission gear train in a second transmission gear train group constituted by the plurality of the transmission gear trains in the side of a high speed range.

3. The automatic transmission according to claim 2, wherein:
   said first bypass clutch is connected to one of the drive gears constituting said first transmission gear train group;
   said second bypass clutch is connected to one of the drive gears constituting said second transmission gear train group; and
   the respective drive gears are arranged in adjacent to said bypass clutches.

4. The automatic transmission according to claim 1, further comprising:
   a damper arranged between the crankshaft of the engine and said input clutch for damping engine vibration.

5. The automatic transmission according to claim 1, further comprising:
   a fluid torque converter provided with a lockup mechanism arranged between the crankshaft of the engine and said input clutch.

6. The automatic transmission according to claim 1, further comprising:
   a fluid coupling provided with a lockup mechanism arranged between the crankshaft of the engine and said input clutch.

7. The automatic transmission according to claim 1 wherein said input clutch and plurality of bypass clutches are concentrically arranged in series between the engine and the input shaft.

8. The automatic transmission according to claim 1 wherein:
   one of said bypass clutches has a smaller diameter than a diameter of a second of said bypass clutches.

9. The automatic transmission according to claim 8, further comprising:
   a start clutch that is arranged between said engine and said input shaft,
   wherein said start clutch is provided to an outer portion of said smaller diameter bypass clutch.

10. The automatic transmission according to claim 1, further comprising:
    an electric control throttle for controlling an engine torque and an engine speed;
    wherein said engine torque is adjusted by controlling said electric control throttle while synchronizing with the control of one of said bypass clutches.

11. The automatic transmission according to claim 1, further comprising:
    a start clutch that is arranged between said engine and said input shaft,
    wherein said start clutch is disconnected or set to a half clutch state in accordance with a preset program at the time of shifting gears.

12. The automatic transmission according to claim 1, wherein:
    said bypass clutch control means controls at least one of said plurality of bypass clutches at the time of shifting gears by engaging the bypass clutch for a predetermined time on the basis of a preset program.

13. The automatic transmission according to claim 12, wherein:
    said bypass clutch control means controls at least one of said plurality of bypass clutches according to at least one of an acceleration opening degree, a vehicle speed, an engine speed and a transmission gear position.

* * * * *